(12) United States Patent
Marc et al.

(10) Patent No.: US 11,303,744 B1
(45) Date of Patent: Apr. 12, 2022

(54) SYSTEMS AND METHODS FOR MODES OF WIRELESS COMMUNICATIONS WITHIN A POWER TOOL SYSTEM

(71) Applicant: Hilti Aktiengesellschaft, Schaan (LI)

(72) Inventors: Vetter Marc, Zurich (CH); Nikolovski Stefan, Belgrade (RS); Jovanovic Jelena, Belgrade (RS); Lupper Alfred, Aystetten (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 17/103,420

(22) Filed: Nov. 24, 2020

(51) Int. Cl.
 *H04M 1/21* (2006.01)
 *H04W 4/80* (2018.01)
 *H04W 4/02* (2018.01)

(52) U.S. Cl.
 CPC ............. *H04M 1/21* (2013.01); *H04W 4/023* (2013.01); *H04W 4/80* (2018.02)

(58) Field of Classification Search
 CPC .................................. H04M 1/21; H04W 4/80
 See application file for complete search history.

(56) References Cited

U.S. PATENT DOCUMENTS

2007/0275665 A1* 11/2007 Molnar ................. H04L 1/0002
 455/67.13

FOREIGN PATENT DOCUMENTS

DE 102015226089 * 6/2017 ............. B23B 45/02

* cited by examiner

*Primary Examiner* — Tuan H Nguyen
(74) *Attorney, Agent, or Firm* — Leydig, Voit & Mayer, Ltd.

(57) ABSTRACT

A power tool system includes a power tool having one or more tool components and communications circuitry. The communications circuitry is configured to receive information from the one or more tool components and/or generate the information related to the power tool. The communications circuitry is configured to transmit the information to a communications device in a first mode of wireless communications or to a remote computing device in a second mode of wireless communications, and the communications circuitry determines whether to operate in the first mode or the second mode of wireless communications based on one or more operating factors.

8 Claims, 3 Drawing Sheets

SYSTEMS AND METHODS FOR MODES OF WIRELESS COMMUNICATIONS WITHIN A POWER TOOL SYSTEM

BACKGROUND

The present disclosure relates generally to the field of power tools, and more particularly to systems and methods for modes of wireless communications within a power tool system.

Electrical devices, such as corded or cordless power tools, may be useful in typical construction job sites. Typically, electrical devices include a motor drive and control circuitry for controlling the motor drive. Certain corded power tools may draw power from a fixed power source, while certain cordless power tools may draw power from a rechargeable power source (e.g., rechargeable battery pack). In certain situations, it may be beneficial to have wireless communications between the power tool and various other components on the construction job site and/or to remote computing devices. However, some power tools may not be equipped with such wireless communications.

Accordingly, it may be beneficial to provide systems and methods for wireless communications for use within a power tool system. Furthermore, it may be beneficial to provide for different modes of wireless communications within the power tool system, such that the system is able to switch between modes based on the availability of components proximate to the power tool.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a power tool system includes a power tool having one or more tool components and communications circuitry. The communications circuitry is configured to receive information from the one or more tool components and/or generate the information related to the power tool. The communications circuitry is configured to transmit the information to a communications device in a first mode of wireless communications or to a remote computing device in a second mode of wireless communications, and the communications circuitry determines whether to operate in the first mode or the second mode of wireless communications based on one or more operating factors.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Present embodiments are directed to a communications device configured for use within a power tool system on a construction job site. The communications device may be a tag (e.g., active Near Field Communication (NFC) tag) communicatively coupled to a power tool and/or the power tool battery. Specifically, the communications device may be communicatively coupled to communications circuitry (e.g., NFC module) disposed within the power tool and/or the power tool battery. The communications device may be configured to wirelessly send and/or receive information (e.g., operating information, historical data, unique identification information, etc.) related to the power tool to and/or from the communications circuitry. The communications device may be configured to wirelessly transmit and/or receive information from a remote computing device (smartphone, computer, tablet, mobile device, gateway, or any processor-enabled device). In certain embodiments, the remote computing device (e.g., phone) may be configured to wirelessly send and/or receive information directly form the communications circuitry disposed within the power tool. In particular, the system may alternate between utilizing the remote computing device (e.g., phone mode) and the communications device (e.g., tag mode) for wireless communications based on the availability of these components proximate to the power tool.

Figure 1:
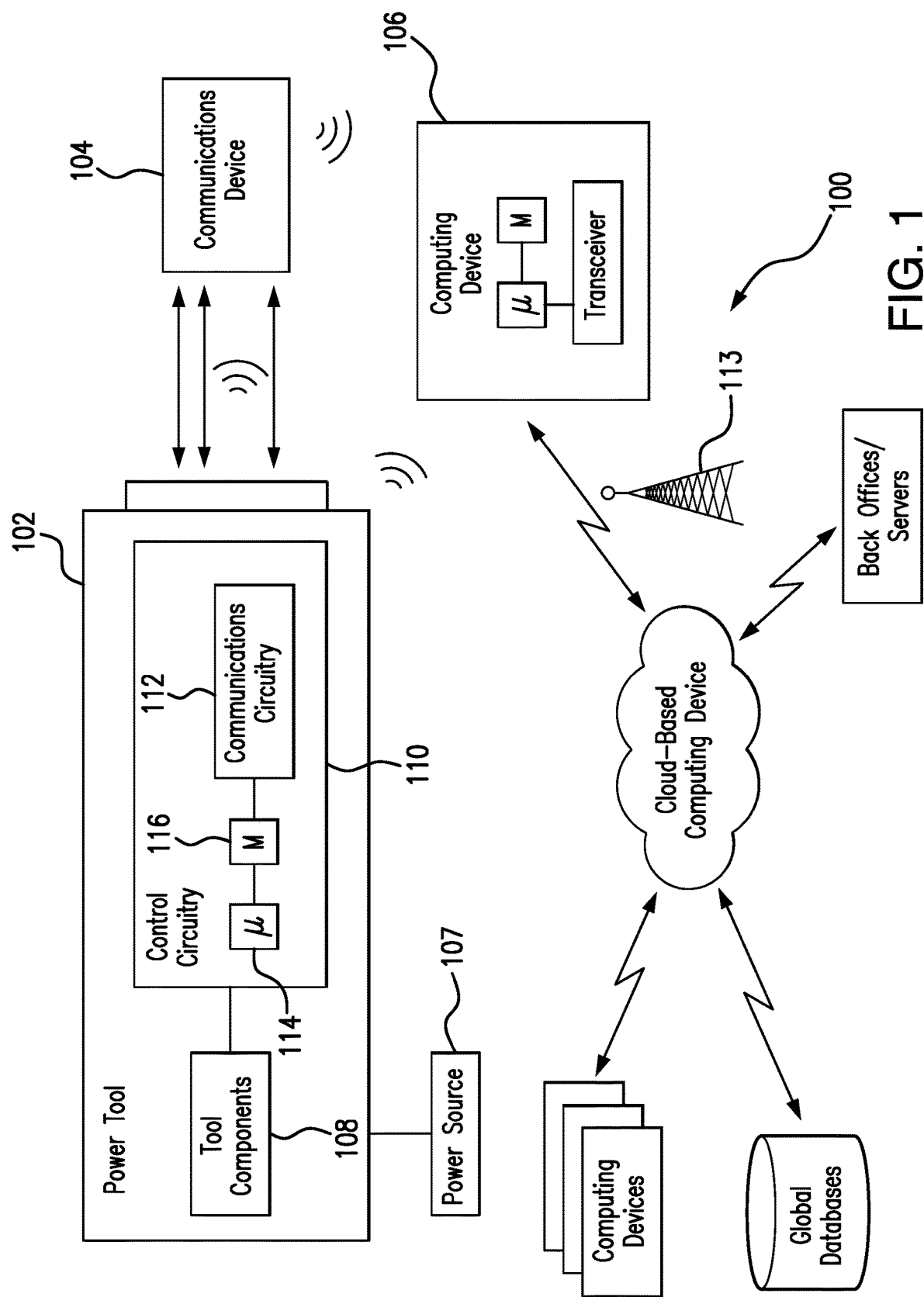
FIG. 1 is a block diagram of an embodiment of a power tool system having a power tool, a communications device, and a computing device in accordance with aspects of the present disclosure.

Turning now to the drawings, FIG. 1 is a block diagram of an embodiment of a power tool system 100 having a power tool 102, a communications device 104, and a computing device 106. In certain embodiments, the power tool 102 may be a cordless power tool configured to receive power from a power source 107. In certain embodiments, the power source 107 may be a rechargeable battery pack (e.g., lithium-ion battery pack) that is removably and physically coupled to the power tool 102 via a power interface. In certain embodiments, the power tool 102 may be a corded power tool configured to receive power from a power outlet or a fixed/portable power source. The power tool 102 may include one or more tool components 108, such as, for example, a motor, a trigger, and/or one or more sensors. In certain embodiments, the power tool 102 includes control circuitry 110 having communications circuitry 112, a processor 114, and a memory 116.

The tool components may include one or more sensors such as safety sensors, position and/or orientation sensors, touch sensors, pressure sensors, accelerometers, temperature sensors, proximity and displacement sensors, image sensors, level sensors, gyroscopes, force sensors, speed sensors, safety sensors, etc. In certain embodiments, the accelerometer may be a one-axis, two-axis, or a three-axis accelerometer configured to gather information related to static and dynamic forces. In certain embodiments, the one or more sensors may be configured to gather raw information, such as movement (e.g., movement intensity), touch, pressure, position, orientation, speed, distance, height, vibrations, acceleration, elevation, and so forth, related to the power tool 102. In certain embodiments, the raw sensor information may be associated with time, so that a timeline or chronology of events may be generated. In certain embodiments, the one or more sensors may be configured to gather and/or determine certain operating parameters related to the power tool 102. The operating parameters related to the power tool 102 may include, but are not limited to, historical information related to the operation of the power tool 102 (e.g., runtime), error codes or alerts triggered by the power tool 102, historical information related to the repair and/or theft of the power tool 102, sensor related information gathered from one or more sensors 108 disposed throughout the power tool 102, information related to the components of the power tool 102, drive signals provided by the control circuitry 116 and/or input signals provided by the trigger 114, and/or the general state of the health of the power tool 102. The control circuitry 110 may be configured to receive the raw information and/or operating information related to the power tool 102. In certain embodiments, the control circuitry 110 may be configured to receive or gather other types of information related to the power tool 102, such as, but not limited to, unique identification information related to the power tool 102, unique identification information related to the manufacturer, owner, and/or previous owners of the power tool 102. In certain embodiments, the control circuitry 110 may be configured to determine or calculate other parameters (e.g., calculated parameters) related to the power tool 102, such as height, distance, velocity, force of impact, free-fall distance, free-fall height, usage total time, transportation total time, idle time, or other similar information derived from the raw information.

The power source 107 may be configured to provide power to operate the motor of the power tool 102. In certain embodiments, the motor may be any type of electric motor that may receive power from an appropriate source (e.g., electrical, pneumatic, hydraulic, etc.). In certain embodiments, the tool components 108, such as the trigger and the motor, may be communicatively coupled to the control circuitry 110. Engaging various functions of the trigger may enable functionality of the power tool 104. For example, engaging the "ON" or "OFF" features of the trigger may provide an input to the control circuitry 110, which in turn may provide drive signals to the motor. In certain embodiments, the power source 107 may be configured to provide power for the tool components 108, the control circuitry 110, and/or the communications circuitry 112 of the power tool 102.

In certain embodiments, the communications device 104 may be a wireless communications tag that is communicatively coupled to the communications circuitry 112 of the power tool 102. For example, the communications device 104 may be configured to receive information (e.g., raw information, operating parameters, calculated parameters, historical information, unique identification information, etc.) from the communications circuitry 112, which may be configured to transmit information gathered and stored within the memory 116 of the control circuitry 110. In the illustrated embodiment, the communications circuitry 112 may include a dynamic active NFC module and/or antenna 113 configured to wirelessly communicate information to the communications device 104. The antenna 113 may be disposed within the communications circuitry 112 or outside of the control circuitry 110, to enable ease of wireless communications. In certain embodiments, the antenna 113 may be disposed on the inner wall of the housing of the power tool 102. In certain embodiments, the antenna 113 is not disposed on the inner wall of the housing of the power tool 102.

While the illustrated embodiment depicts the communications circuitry 112 as an NFC module and/or antenna, it should be noted that the communications circuitry 112 may be include circuitry for any form of wireless communications (e.g., Bluetooth, Wifi, ZigBee, LoRa, LoRaWAN, Sigfox, Cellular, etc.). The communications device 104 may be configured to wirelessly transmit and/or receive information to the remote computing device 106 with any form of wireless communication (e.g., Bluetooth, Near Field Communication (NFC), Wifi, ZigBee, LoRa, LoRaWAN, Sigfox, Cellular, etc.) In particular, in certain embodiments, the communications circuitry 112 may be configured to wirelessly transmit and/or receive information to the remote computing device 106 via any form of wireless communication (e.g., (e.g., Bluetooth, Near Field Communication (NFC), Wifi, ZigBee, LoRa, LoRaWAN, Sigfox, Cellular, etc.). In certain embodiments, the communications circuitry 112 may alternate between transferring information to the remote computing device 106 (e.g., phone mode) or to the communications device 104 (e.g., tag mode) based on the availability of these components proximate to the power tool 102, as further described with respect to FIGS. 2-5.

In certain embodiments, the communications device 104 may be located proximate (geographically and/or physically close) to the power tool 102. For example, the communications device 104 may be within a several centimeters, inches, or feet of the power tool 104. In certain embodiments, the communications device 104 may be removably attached to the power tool 102, such that it is coupled to an external surface 118 of a housing assembly of the power tool 102. For example, the communications device 104 may be attached directly to the external surface 112 of the housing assembly via an adhesive, a tape, one or more fastening devices, or any form of attachment means that allows the communications device 104 to be removably engaged with the housing assembly. The communications device 104 may be attached anywhere on the external surface 112 of the housing assembly. In certain embodiments, the communications device 104 may be removably engaged within a cavity 120 (e.g., sleeve, compartment, etc.) of the housing assembly, such that the cavity 120 is permanently disposed on the external surface 118 of the housing assembly. The cavity 120 may be designed to house the communications device 104, prevent the communications device 104 from accidentally dislodging, and protect the communications device 104 from environmental factors or impact. The communications device 104 may be configured to adapt and/or conform to the shape of the cavity 122 when it is removably inserted within the cavity 122. In certain embodiments, the communications device 104 may be remote from the power tool 102, such that it is coupled to a device proximate to the power tool 102. In certain embodiments, the communications device 104 may be accidentally dislodged or removed from the power tool 102.

The remote computing device 106 (e.g., smartphone, computer, tablet, mobile device, gateway, or any processor-enabled device) may include a processor 126 configured to execute instructions stored on a memory 128. Further, the remote computing device 106 may include a transceiver 130 (e.g., configured for NFC, Wifi, Bluetooth, etc.) that is configured to communicate the information received from the communications device 104 or the communications circuitry 112 to a cloud-based computing device 132 via a wired connection or wireless connection. For example, the wireless protocols utilized may include WiFi (e.g., Institute of Electrical and Electronics Engineers [IEEE] 802.11X, cellular conduits (e.g., high speed packet access [HSPA], HSPA+, long term evolution [LTE], WiMax), near field communications (NFC), Bluetooth, personal area networks (PANs), and the like. The cloud-based computing device 132 may be a service provider providing cloud analytics, cloud-based collaboration and workflow systems, distributed computing systems, expert systems and/or knowledge-based systems. In certain embodiments, the cloud-based computing device 132 may be a data repository that is coupled to an internal or external global database 136.

Further, in certain embodiments, the global database 136 may allow computing devices 134 to retrieve information stored within for additional processing or analysis. Indeed, the cloud-based computing device may be accessed by a plurality of systems (computing devices 134 and/or computing devices from back offices/servers 138) from any geographic location, including geographic locations remote from the physical locations of the systems. Accordingly, the cloud 132 may enable advanced collaboration methods between parties in multiple geographic areas, provide multi-party workflows, data gathering, and data analysis, which may increase the wireless capabilities of connectivity of the power tool 102.

Figure 2:
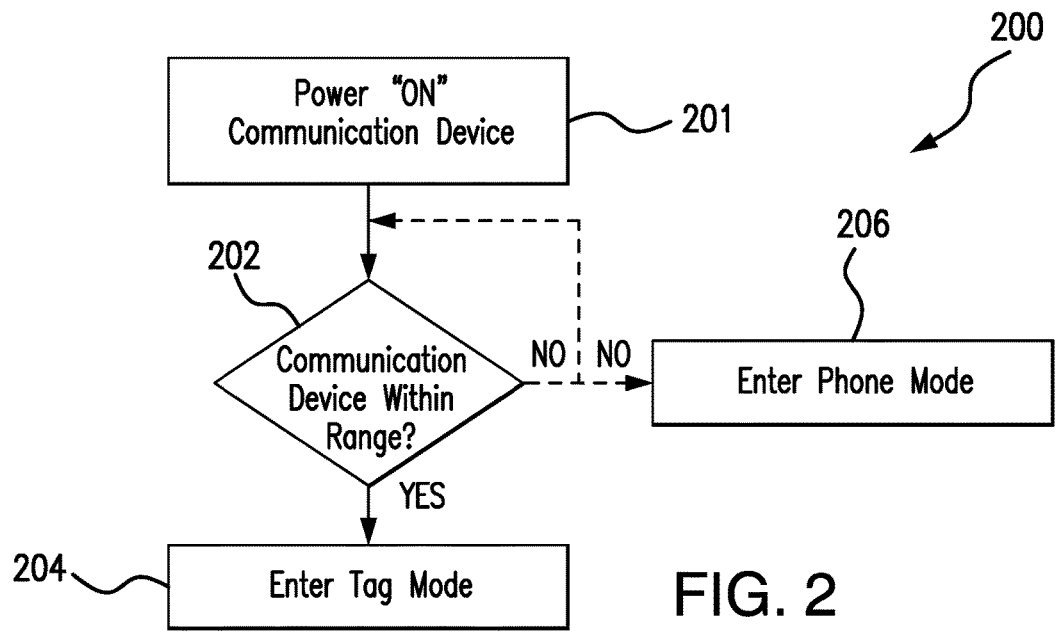
FIG. 2 is an embodiment of a method for switching between modes of wireless communication for the power tool system of FIG. 1, in accordance with aspects of the present disclosure.

FIG. 2 is an embodiment of a method 200 for switching between modes of wireless communication for the power tool system 100 of FIG. 1, in accordance with aspects of the present disclosure. The method 200 includes powering "ON" the communications device 104 (block 201). In certain embodiments, the communications device 104 is automatically powered "ON" when the power tool 102 is powered "ON." Further, the method 200 includes determining, via the communications circuitry 112 of the power tool 100, whether the communications device 104 is within a pre-determined range of the power tool 100 (block 202). The pre-determined range may be a pre-determined distance from the power tool 102, such as a pre-determined number of feet, yards, or inches from the power tool. The method includes entering into a first mode of wireless communications ("tag mode") if the communication device 104 is within the pre-determined range of the power tool 100 (block 204). In other words, if the communication device 104, such as, for example, a wireless communications tag, is within several centimeters, inches, or feet of the power tool 104, the communications circuitry 112 of the power tool 102 may be configured to enter the "tag mode" of wireless communications, as further described in detail with respect to FIG. 4. In certain embodiments, the communications device 104 may be within range if it is removably attached to the power tool 102, such that it is coupled to the external surface 118 of a housing assembly of the power tool 102.

If a communications device 104 is not within range of the power tool 102, the method 200 includes rechecking a pre-determined number of times to determine whether the communications device is within the range. For example, the communications circuitry 112 of the power tool 102 may check two, three, four, five, six, seven, eight, nine, ten or more times to determine if the communications device 104 is within range of the power tool 102. If the communications device 104 is not within the range of the power tool 102 after several iterations, the communications circuitry 112 may be configured to enter a second mode of wireless communications ("phone mode") (block 206), as further described in detail with respect to FIG. 5.

Upon powering the power tool 102 from "OFF" to "ON," the communications circuitry 112 of the power tool 102 utilizes the method 200 to determine a mode of wireless communication by determining if the communications device 104 is within range. Once a mode of wireless communication is selected, the communications device 104 operates within that mode for the duration of time that the power tool 102 and/or the communications device 104 are "ON." Upon powering the power tool 102 and/or the communications device 104 "OFF" from "ON," the communications circuitry 112 stores data (e.g., any un-transferred data) within a buffer (e.g., the memory 116) until the power tool 102 is powered "ON" again. In this manner, information is efficiently transferred from the power tool 102 with the most available mode of wireless communications. In certain embodiments, the power tool 102 may alternate between modes of wireless communications based on the availability of the devices within range.

Figure 3:
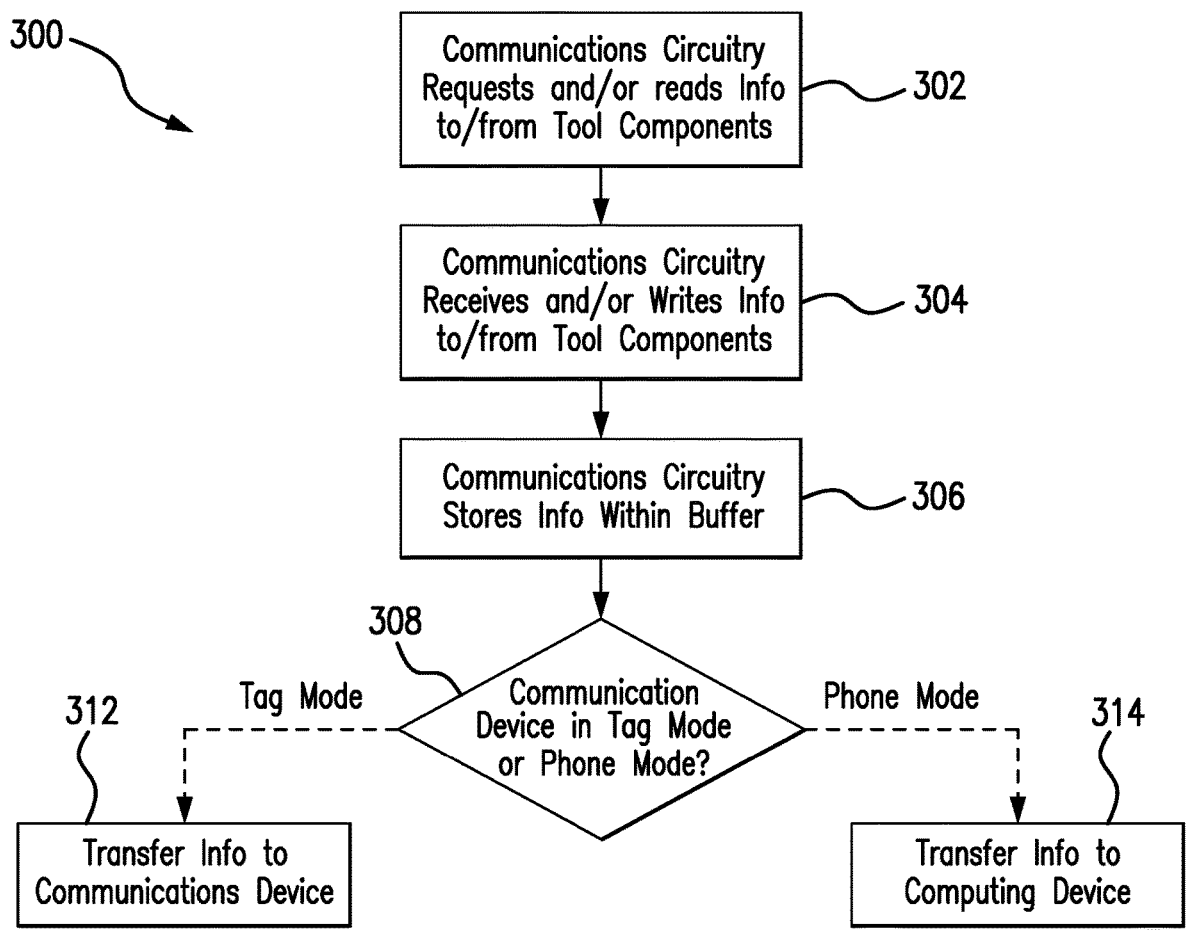
FIG. 3 is an embodiment of a method for the power tool to receive and store information, in accordance with aspects of the present disclosure.

FIG. 3 is an embodiment of a method 300 for the communications circuitry 112 of the power tool 102 to receive/send (e.g., read and write) and store information from the tool components 108, in accordance with aspects of the present disclosure. The method 300 includes requesting and/or reading, via the communications circuitry 112 of the power tool 102, information to/from the tool components 108 (block 302). As noted above, the information may include operating information, historical data, unique identification information, or similar information related to the power tool 102. The method 300 includes receiving and/or writing information to/from the tool components 108 (block 304), and storing the information within the buffer (e.g., the memory 116) of the power tool 102 (block 306). In particular, the communications circuitry 112 of the power tool 102 may be configured to read and/or write information to the tool components, so that communications happen bi-directionally.

In certain embodiments, the method 300 includes determining if the communications device 104 is within a tag mode or a phone mode, as discussed above with respect to FIG. 3 (block 308). As noted above, upon powering the power tool 102 from "OFF" to "ON," the communications circuitry 112 of the power tool 102 utilizes the method 200 to determine a mode of wireless communication by determining if the communications device 104 is within range. Once a mode of wireless communication is selected, the communications device 104 operates within that mode for the duration of time that the power tool 102 and/or the communications device 104 are "ON." Accordingly, if the method 300 determines that the communications device 104 is within the tag mode, the method 300 further includes transferring information to and from the buffer to the communications device 104 (block 312), as further described with respect to FIG. 4. Further, if the method 300 determines that the communications device 104 is within the phone mode, the method 300 includes transferring and/or receiving information to and from the buffer to the computing device 106 (block 314), as further described with respect to FIG. 5.

Figures 4, 5:
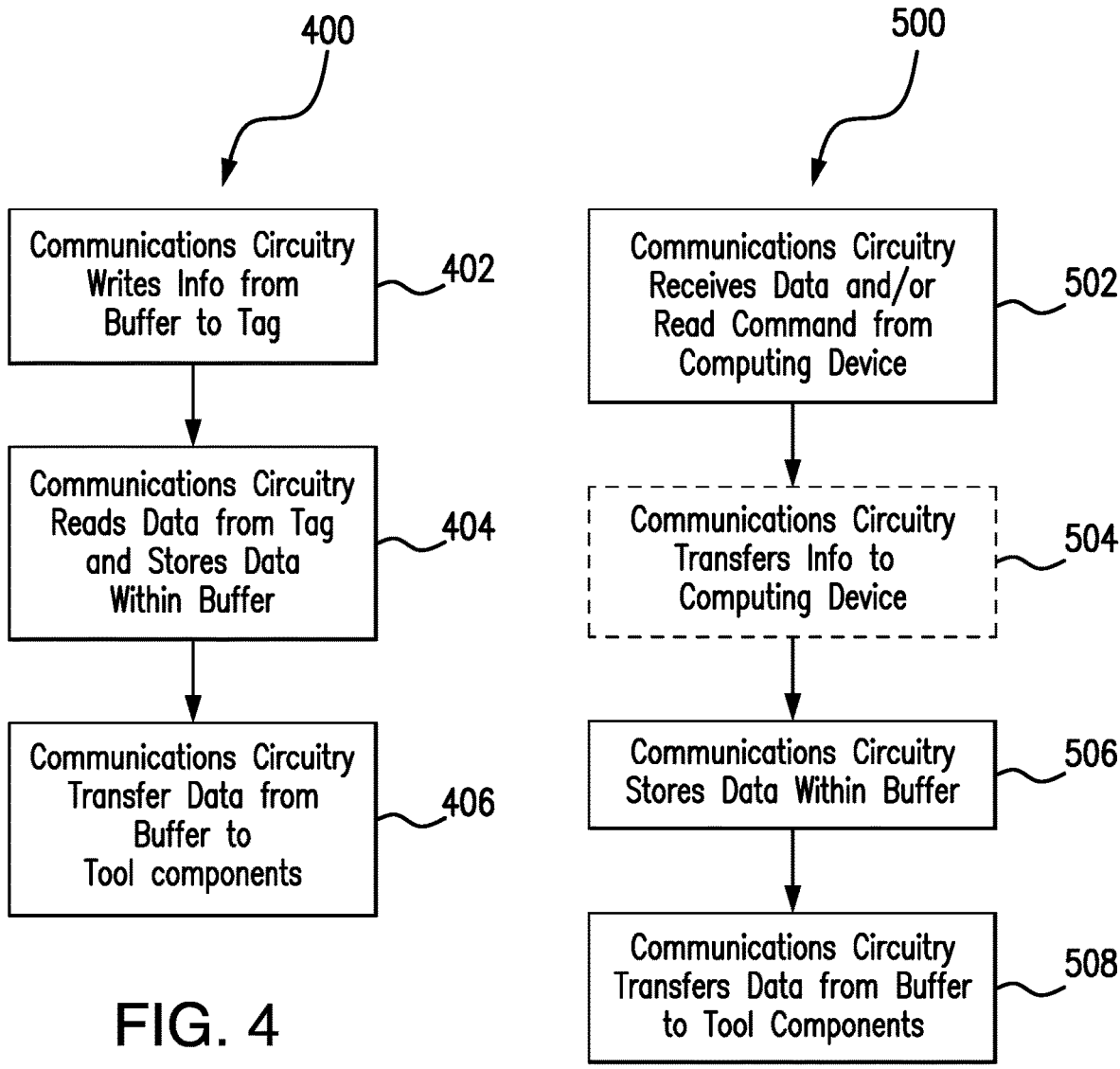
FIG. 4 is an embodiment of a method for a first mode of wireless communication for the power tool system of FIG. 1, in accordance with aspects of the present disclosure.
FIG. 5 is an embodiment of a method for a second mode of wireless communication for the power tool system of FIG. 1, in accordance with aspects of the present disclosure.

FIG. 4 is an embodiment of a method 400 for a first mode of wireless communication for the power tool system 100 of FIG. 1, in accordance with aspects of the present disclosure. In certain embodiments, the first mode of wireless communication may include transferring information between the power tool 102 and the communications device 104 (e.g., the wireless tag), and may be referred to as operating the power tool 102 within a "tag mode." The method 400 includes writing information from the buffer of the power tool 102 (e.g., the memory 116) to the communications device 104 (e.g., the wireless tag) (block 402). For example, operating information, historical data, unique identification information related to the power tool 102 may be transferred from the power tool 102 to the communications device 104.

The method 400 includes reading information from the communications device 104 and storing the data within the buffer (e.g., the memory 116) via the communications circuitry 112 (block 404). For example, the communications device 104 may receive and transfer commands, such as lock-down commands, operating commands, etc. to the communications circuitry 112. Further, the method includes transferring this information from the communications circuitry 112 to the tool components 108 so that it may be implemented by the power tool 102 (block 406).

FIG. 5 is an embodiment of a method for a second mode of wireless communication for the power tool system of FIG. 1, in accordance with aspects of the present disclosure. In certain embodiments, the second mode of wireless communication may include transferring information between the power tool 102 and the computing device 106 (e.g., the smartphone), and may be referred to as operating the power tool 102 within a "phone mode." Specifically, the phone mode may include transferring information without the use of an intermediary communications device 104, such as a wireless tag. The method 500 includes receiving, via the communications circuitry 112 of the power tool 102, data and/or a read command from the computing device 106 (block 502). For example, in certain embodiments, the communications circuitry 112 may receive information such as lock-down commands, operating commands, read commands, etc. from the computing device 106. In certain embodiments, the computing device 106 may first send a read command to initiate wireless communications with the power tool 102. If the communications circuitry 112 first receives a read command, the method 500 further includes transferring, via the communications circuitry 112, additional information, such as other operating commands and/or lock-down commands (block 504).

The method 500 includes storing the data within the buffer (e.g., the memory 116) via the communications circuitry 112 (block 506). Further, the method 500 includes transferring this information from the communications circuitry 112 to the tool components 108 so that it may be implemented by the power tool 102 (block 508).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed:

1. A power tool system, comprising:
a power tool, wherein the power tool comprises:
one or more tool components; and
communications circuitry configured to receive information from the one or more tool components and/or generate the information related to the power tool, and wherein the communications circuitry is configured to transmit the information to a wireless tag in a first mode of wireless communications or to a remote computing device in a second mode of wireless communications, and wherein the communications circuitry determines whether to operate in the first mode or the second mode of wireless communications based on one or more operating factors, wherein the wireless tag is configured to removably couple to an external surface of a housing of the power tool.

2. The power tool system of claim 1, wherein the communications circuitry is configured to receive one or more commands from the wireless tag in the first mode of wireless communications or from the remote computing device in the second mode of wireless communications, and wherein the communications circuitry determines whether to operate in the first mode or the second mode of wireless communications based on the one or more operating factors.

3. The power tool system of claim 2, wherein the communications circuitry determines whether to operate in the first mode or the second mode of wireless communication upon powering "ON" the power tool and/or the wireless tag.

4. The power tool system of claim 2, wherein the one or more operating factors comprises a proximity of the wireless tag relative to the power tool.

5. The power tool system of claim 2, wherein the one or more commands comprises one or more of operating commands, read commands, lock-down commands, un-lock commands, or a combination thereof.

6. The power tool system of claim 1, wherein the power tool operates in the first mode of wireless communication when the wireless tag is coupled to the external surface of the housing of the power tool.

7. The power tool system of claim 1, wherein the power tool operates in the second mode of wireless communications when the wireless tag is not coupled to the external surface of the housing of the power tool or when the communications device is not working.

8. The power tool system of claim 1, wherein the information comprises operating information, historical data, and/or unique identification information related to the power tool.

* * * * *